(12) United States Patent
Salomon (10) Patent No.: US 12,516,927 B2
(45) Date of Patent: Jan. 6, 2026

(54) ULTRASONIC SENSOR ASSEMBLY FOR A MOTOR VEHICLE, AND MOTOR VEHICLE

(71) Applicant: Valeo Schalter und Sensoren GmbH, Bietigheim-Bissingen (DE)

(72) Inventor: Sylvio Salomon, Bietigheim-Bissingen (DE)

(73) Assignee: Valeo Schalter und Sensoren GmbH, Bietigheim-Bissingen (DE)

( * ) Notice: Subject to any disclaimer, the term of this patent is extended or adjusted under 35 U.S.C. 154(b) by 295 days.

(21) Appl. No.: 18/265,602

(22) PCT Filed: Dec. 1, 2021

(86) PCT No.: PCT/EP2021/083689
§ 371 (c)(1),
(2) Date: Jun. 6, 2023

(87) PCT Pub. No.: WO2022/122494
PCT Pub. Date: Jun. 16, 2022

(65) Prior Publication Data
US 2024/0035814 A1    Feb. 1, 2024

(30) Foreign Application Priority Data
Dec. 8, 2020   (DE) .................... 10 2020 132 623.8

(51) Int. Cl.
*G10K 11/24* (2006.01)
*G01B 17/00* (2006.01)
(Continued)

(52) U.S. Cl.
CPC .............. *G01B 17/00* (2013.01); *G10K 11/24* (2013.01); *G01S 15/931* (2013.01)

(58) Field of Classification Search
CPC ........ G01B 17/00; G10K 11/24; G10K 11/02; G10K 9/18; G01S 15/931; G01S 2015/938; G01S 7/521; B60W 2420/54
See application file for complete search history.

(56) References Cited

U.S. PATENT DOCUMENTS

2016/0297372 A1   10/2016   Hallek et al.
2017/0059697 A1    3/2017   Esmail

FOREIGN PATENT DOCUMENTS

CN       111142092 A       5/2020
DE   102008027970 A1 *  12/2009   ............. G01H 11/08
(Continued)

OTHER PUBLICATIONS

Office Action issued in counterpart Korean Patent Application No. 10-2023-7019236 mailed Mar. 21, 2025 (16 pages).
(Continued)

*Primary Examiner* — Laura Martin
*Assistant Examiner* — Anthony W Megna Fuentes
(74) *Attorney, Agent, or Firm* — Osha Bergman Watanabe & Burton LLP (57) ABSTRACT

An ultrasonic sensor assembly (1) for a motor vehicle (16) comprises: an ultrasonic sensor (2) having a housing (4), an ultrasonic membrane (5) mechanically decoupled from the housing (5) and a sound transducer element (7) for exciting vibrations and detecting vibrations of the ultrasonic membrane (5); and a screen section (3) arranged in front of the ultrasonic membrane (5) and made of an acoustic metamaterial. The metamaterial is preferably a broadband metamaterial, which can be tunneled in a non-resonant manner in an angular range. The screen section (3) may preferably be formed in a shaped part (13), such as a bodywork metal sheet of the exterior skin or an interior paneling, of the motor vehicle (16).

16 Claims, 6 Drawing Sheets

(51) Int. Cl.
*G01S 7/521* (2006.01)
*G01S 15/931* (2020.01)
*G10K 9/18* (2006.01)
*G10K 11/02* (2006.01)

(56) References Cited

FOREIGN PATENT DOCUMENTS

| DE | 102010044998 | A1 | | 3/2012 | |
|---|---|---|---|---|---|
| DE | 102011121095 | A1 | * | 6/2013 | ............ G01S 7/521 |
| DE | 102012208059 | A1 | | 11/2013 | |
| DE | 112013006785 | T5 | | 12/2015 | |
| DE | 102015113195 | A1 | | 2/2017 | |
| DE | 102017209823 | A1 | | 12/2018 | |
| DE | 112013006785 | A1 | | 7/2019 | |
| JP | 2006-345312 | A | | 12/2006 | |
| JP | 2011-035884 | A | | 2/2011 | |
| KR | 20160008280 | A | * | 1/2016 | ............ G01N 29/24 |
| KR | 10-2017-0011677 | A | | 2/2017 | |

OTHER PUBLICATIONS

Office Action Issued in Corresponding JP Application No. 2023-534704, dated Aug. 20, 2024. (15 Pages with English Translation).
International Search Report in corresponding International Application No. PCT/EP2021/083689, dated Mar. 29, 2022 (13 pages).
German Search Report in corresponding German Application No. 10 2020 132 623.8, dated Sep. 17, 2021 (5 pages).
D'Aguanno G. et al."Broadband metamaterial for nonresonant matching of acoustic waves" Scientific Reports, vol. 2, No. 1, Mar. 28, 2012 (Mar. 28, 2012), DOI: 10.1038/srep00340, XP055903064 (5 pages).

* cited by examiner

ULTRASONIC SENSOR ASSEMBLY FOR A MOTOR VEHICLE, AND MOTOR VEHICLE

The present invention relates to the field of ultrasonic sensors for motor vehicles and more specifically to an ultrasonic sensor assembly for a motor vehicle and to a motor vehicle.

Ultrasonic sensors with a housing, an ultrasonic membrane mechanically decoupled from the housing and a sound transducer element for exciting vibration and detecting vibration of the ultrasonic membrane are known.

An ultrasonic sensor of that type can be used to measure a distance from an object in the motor vehicle vicinity or from an object in the interior of the vehicle using the pulse-echo method. The ultrasonic membrane, stimulated by the transducer element, emits energy in the form of an ultrasonic signal. The sound transducer element then detects vibrations in the ultrasonic membrane, which originate from an echo signal returning from the motor vehicle vicinity or the interior. The distance from the object is determined based on the signal time of flight. Such measurements are used, for example, by a parking assistance system of the motor vehicle.

Desirable properties are a short blind time of the ultrasonic sensor after emitting the ultrasonic signal, low background noise, and a high signal-to-noise ratio. In other words, high amplitudes of the measured returning echo signal and low levels of structural vibrations of the housing and possibly other components are desirable.

Conventionally, an ultrasonic sensor is therefore preferably arranged uncovered, without an additional component being arranged between the ultrasonic membrane and the vehicle environment or the interior to be measured. If a covered installation is desired, for example behind the vehicle outer skin, measures are taken to reduce the structure-borne noise of the covering components, such as the arrangement of damping elements on the covering component.

Document DE 102010044998A1 teaches a fender with a recess to allow ultrasonic detection through the recess, the recess being covered with a flexible film that does not interfere with the detection function of the sensor. The film couples the ultrasonic sensor to the vehicle exterior.

Document DE 102012208059 A1 teaches a sensor assembly with a sensor unit integrated in a fender, wherein the membrane is formed by the fender itself.

DE 102015113195 A1 teaches that an ultrasonic sensor is arranged concealed behind a paneling part in a first region of the paneling part. The first region of the paneling part and the membrane of the ultrasonic sensor are mechanically coupled in such a way that the reflected ultrasonic signal excites the membrane and the paneling part into mechanical vibrations. In a second region of the paneling part surrounding the first region, a plurality of through-openings are arranged to dampen the vibrations of the paneling part.

DE 102017209823 A1 teaches an ultrasonic sensor, the vibration membrane of which is formed as an acoustic metamaterial which exhibits resonant behavior within a frequency band of the membrane.

US 2017059697 A1 teaches an arrangement in which an ultrasonic sensor is covered behind an inner side of a shaped part and is intended to detect objects on the outside of the shaped part. A preloading structure presses the ultrasonic sensor against the inside of the shaped part, wherein a coupling element is arranged between the ultrasonic sensor and the inside surface. In a region outside the coupling element, a damping material is attached to the inside of the shaped part.

Against this background, the object of the present invention is to provide an improved ultrasonic sensor assembly for a vehicle and an improved motor vehicle.

The inventors of the present application have developed the idea that the use of a broadband metamaterial for non-resonant impedance matching, as described in G. D. Aguanno et. al. "Broadband metamaterial for nonresonant matching of acoustic waves", Sci. Rep. 2, 340: DOI: 10.1038/srep003401 (2012), accessed on 21.10.2020 at https://www.ncbi.nlm.nih.gov/pmc/articles/PMC3314304/?tool=pmcentrez, for medical diagnostic purposes and other micromechanical systems, could also offer advantages in the field of ultrasonic measurement of a motor vehicle environment or interior, and on the basis of further considerations and experiments have finally reached the solution described below.

According to a first aspect, an ultrasonic sensor assembly for a motor vehicle is proposed, which comprises: an ultrasonic sensor having a housing, an ultrasonic membrane mechanically decoupled from the housing, and a sound transducer element for exciting vibrations and detecting vibrations of the ultrasonic membrane; and a screen section arranged in front of the ultrasonic membrane and made of an acoustic metamaterial.

The inventors have experimentally identified the surprising effect that the acoustic meta-material arranged in front of the ultrasonic membrane not only does not reduce the amplitude of the measured signal, which corresponds to the reflected ultrasonic wave, compared to an uncovered ultrasonic sensor, but also significantly increases it. The signal-to-noise ratio can thus be significantly improved.

At the same time, advantageously, the screen section can visually and mechanically cover the ultrasonic sensor and thus protect it, for example, from view and from the effects of impacts and the like.

In particular, the screen section is arranged in front of the ultrasonic membrane in such a way as to cover the ultrasonic membrane. "Cover" is understood to mean that ultrasonic waves emitted from the ultrasonic membrane into a spatial region to be measured (motor vehicle environment or motor vehicle interior) and ultrasonic waves reflected from there back to the ultrasonic membrane pass through the screen section in each case. "Uncovered" is understood to mean that ultrasonic waves can be emitted unhindered into the spatial region to be measured and reflected back from it, i.e. that there is only air between the ultrasonic membrane and the object to be measured in the spatial region to be measured.

The ultrasonic membrane can be acoustically decoupled from the housing of the ultrasonic sensor, for example, by means of a decoupling ring made of an acoustically soft material such as silicone. The ultrasonic membrane may be inserted into an opening in the housing, wherein the decoupling ring is arranged between the ultrasonic membrane and the housing inner edge of the opening.

The sound transducer element may be a sound transducer element based on a mechanical-inductive, mechanical-capacitive, mechanical-resistive, magnetostrictive or electrostrictive principle. The sound transducer element can be a piezo element, for example. The sound transducer element can be adhesively bonded to the ultrasonic membrane inside the housing, welded thereto, or connected to the ultrasonic membrane in a different way. The sound transducer element may be connected to an externally routed electrical contact of the ultrasonic sensor via a loose decoupling wire.

The screen section can be a section of a larger shaped part of the motor vehicle, which forms the screen section only in a region arranged in front of the ultrasonic membrane of the ultrasonic sensor. However, the screen section can also comprise a substantially entire region of a stand-alone screen or the like, which is provided in front of the ultrasonic membrane for the specific purpose of covering it.

An acoustic metamaterial is to be understood in particular as a material to which advantageous acoustic properties are imparted by structuring processing, which the unprocessed or unstructured material does not have.

The acoustic metamaterial may be, in particular, a metamaterial which is designed according to the principles described in the publication by D'Aguanno et al. cited above, to which explicit reference is made.

According to one embodiment, the acoustic metamaterial is a broadband acoustic metamaterial which can be tunneled by ultrasonic waves in a non-resonant manner, at least in an incidence angle range.

In particular, "broadband" should be understood to mean that the acoustic metamaterial is uniformly well permeable not only for ultrasonic waves with a specific resonance frequency, but for ultrasonic waves in a broad frequency band of, for example, 40 to 60 kHz, preferably from 16 to 100 kHz.

The phrase "able to be tunneled in a non-resonant manner" means, in particular, that an ultrasonic wave incident on the acoustic metamaterial "feels" an identical acoustic impedance in the medium from which it arrives, such as air, and in the acoustic metamaterial, so that substantially no reflections occur either at the incident surface or at the exit surface, regardless of the frequency of the ultrasonic wave and regardless of the thickness of the acoustic metamaterial.

"Non-resonant" is to be understood in particular to mean that no resonant pressure bulges develop within the metamaterial when tunneling occurs through the acoustic metamaterial. Such non-resonant tunneling capability corresponds to the broadband nature of the acoustic metamaterial.

The non-resonant tunneling capability preferably exists at least in an ultrasonic wave incidence angle range which comprises a substantially perpendicular direction of incidence on a surface of the screen section of the acoustic metamaterial. In practice, angle ranges between 0° and 30° to 85° relative to the surface normals can be achieved.

In other words, an acoustic impedance on one side of the screen section composed of the acoustic metamaterial can be matched to an acoustic impedance of the air in the spatial region to be measured, and an acoustic impedance on another side of the screen section can also be matched to the acoustic impedance of air or also to the acoustic impedance of the ultrasonic membrane of the ultrasonic sensor arranged on the other side.

According to a further embodiment, the acoustic metamaterial is formed from an acoustically hard base material in which a lattice of a plurality of through-openings is formed.

In particular, "acoustically hard" is understood to mean a base material that has a high acoustic resistance in the unprocessed state and in which reflections occur when sound waves are incident on it in the unprocessed state. Examples of an acoustically hard base material are, e.g. a metal sheet that can be part of an outer shell of a vehicle, a plastic plate that can be part of an interior paneling of a vehicle, and the like.

The plurality of through-openings may be, in particular, openings with a circular cross-section that extend from one side of the screen section to the opposite side of the screen section.

Compared to other possible embodiments of an acoustic metamaterial, a structure with a lattice of a plurality of circular through-openings is advantageously characterized by particularly favorable transmission properties.

According to a further embodiment, a diameter of each through-opening is smaller than a wavelength of the ultrasonic waves to be emitted and received by the ultrasonic membrane.

The frequency of the ultrasonic waves to be transmitted and received, i.e. the natural frequency of the ultrasonic membrane, is between 16 and 100 kHz, for example, preferably between 40 and 60 kHz and particularly preferably a value of 50 kHz. Accordingly, at a temperature of 20° C., a resulting wavelength of the ultrasonic waves to be emitted and received by the ultrasonic membrane is between 21 and 3 mm, preferably between 9 and 6 and particularly preferably a value of 7 mm. Other temperatures produce different wavelengths.

The diameter of the respective openings is particularly preferably chosen to have a value which is smaller by a, preferably integer, factor of 2 or more than the corresponding expected wavelength at 20° C., for example 1 mm.

According to a further embodiment, a distance between two adjacent openings of the lattice is greater than the diameter of the openings and less than the wavelength of the ultrasonic waves to be emitted and received by the ultrasonic membrane.

For example, the hole spacing can be chosen to be between 2 and 4 mm and particularly preferably 2.5 mm.

The inventors were able to use such an acoustic metamaterial comprising a plate-shaped screen section made of steel, aluminum or plastic with a perforated lattice with a hole spacing of 2.5 mm and a hole diameter of 1 mm to achieve an increase in the received signal amplitude and a corresponding improvement in the signal-to-noise ratio—depending on the distance between the ultrasonic membrane and the screen section—by a factor of 1.5 to 10 compared to an uncovered arrangement of the ultrasonic sensor.

An advantageous variant provides that the through-openings are filled with a filler material that differs from the base material. Preferably, the filler material is an acoustically soft material, such as silicone. This allows a closed surface to be achieved.

According to a further embodiment, the proposed ultrasonic sensor assembly further comprises a shaped part, on which the ultrasonic sensor is mounted in such a way that the ultrasonic membrane faces the shaped part, and the shaped part comprises the screen section of the acoustic metamaterial in a section in front of the ultrasonic membrane.

The shaped part may be formed in particular from the same base material from which the acoustic metamaterial is formed, for example from sheet metal or plastic.

In particular, the shaped part may be formed integrally with the screen section. The screen section may be formed in the shaped part retrospectively, for example, by perforating the shaped part.

The shaped part may be a shaped part which has a predetermined function in the motor vehicle, to which the ultrasonic sensor might be additionally attached in one proposal, and on which a screen section from an acoustic metamaterial is formed in a region in front of the ultrasonic membrane of the ultrasonic sensor by structuring. This allows the sensor to be concealed behind the shaped part while still allowing the spatial region on the other side of the shaped part to be measured with high echo signal amplitudes.

Alternatively, the shaped part may be provided for the specific purpose of mounting the ultrasonic sensor on it and forming the screen section. For example, it is envisaged to provide an ultrasonic sensor, which could in principle be mounted uncovered in or on the vehicle, with a screen which needs to be only slightly larger than the ultrasonic sensor and is intended to exploit the advantages of the screen section of the acoustic metamaterial for the ultrasonic sensor assembly.

According to one embodiment, the ultrasonic sensor is attached to the shaped part by an outer wall of the housing of the ultrasonic sensor being connected to a mounting bracket and the bracket being fastened to the shaped part in a region outside the screen section, wherein the surface of the ultrasonic membrane is arranged parallel to the shaped part behind the screen section of the shaped part.

In this way, the housing can advantageously be mounted stably on the shaped part, whereas the sensor membrane, which is mechanically decoupled from the housing, is not attached to the shaped part or is mechanically decoupled from the shaped part.

According to a further embodiment, the shaped part is a shaped part of the vehicle body.

In particular, the vehicle body shaped part may form a section of the outer skin of the vehicle. Accordingly, the ultrasonic sensor assembly can be concealed behind the outer skin of the vehicle so that the advantages of a concealed arrangement—protection against external mechanical effects, aerodynamics and design specifications—can be combined with the advantages of the acoustic metamaterial, namely a significantly higher signal amplitude of the echo signal. The acoustic meta-material can be formed by structured processing of the outer skin of the vehicle—forming a lattice, hardly visible from the outside, of passage openings with a suitable hole distance and opening diameter in the outer skin of the vehicle as described above.

According to a further embodiment, the shaped part is a vehicle body panel, a fender, a lower shell of a vehicle wing mirror, a privacy screen, or a vehicle interior paneling.

An ultrasonic sensor assembly with an ultrasonic sensor mounted behind a vehicle body panel or behind or inside a fender can be used to monitor the vehicle surroundings. An ultrasonic sensor assembly with an ultrasonic sensor mounted behind a vehicle interior paneling can be used to monitor the vehicle interior. An ultrasonic sensor assembly with an ultrasonic sensor, provided behind or above a lower shell of a vehicle wing mirror, can be used for monitoring a depth of puddles and the like in the ground.

According to a further embodiment, the ultrasonic membrane is in contact with the screen section.

In particular, the ultrasonic membrane may be in contact with the screen section without contact pressure and/or without being fixed to the screen section.

In particular, the acoustic impedance of the side of the acoustic metamaterial facing the ultrasonic membrane can be matched to the acoustic impedance of the ultrasonic membrane.

In the present embodiment, the observed effect of a drastic increase in the echo signal amplitude can be advantageously achieved.

In addition, damping elements, such as bored holes or damping material, may be provided on the shaped part outside the screen section. In this way, it is possible to further counteract the formation of structure-borne noise in the shaped part.

According to a further embodiment, the ultrasonic membrane and the screen section are mechanically decoupled.

According to a further embodiment, an air gap is formed between the ultrasonic membrane and the screen section.

The air gap is one possible means of mechanically decoupling the ultrasonic membrane from the screen section or the shaped part. Since the ultrasonic membrane is also mechanically decoupled from the housing of the ultrasonic sensor, no mechanical or acoustic coupling is thus provided between the ultrasonic membrane and the shaped part on which the housing of the ultrasonic sensor is mounted. Accordingly, the shaped part is rarely excited to structural vibration. Accordingly, damping elements on the shaped part, such as attached damping material, bored holes designed for damping and the like, can be advantageously dispensed with.

Due to the good transmission properties of the proposed acoustic metamaterial, it is not necessary to mechanically couple the ultrasonic membrane with the screen section. The air gap can preferably be thin, particularly preferably thinner than 1 mm, and particularly preferably 0.1 mm thin or even thinner. In this case, the beneficial effect of an amplification of the echo signal by the acoustic metamaterial can be achieved particularly readily.

According to a second aspect, a motor vehicle having at least one ultrasonic sensor assembly as described above is proposed.

The features, advantages, and embodiments described for the ultrasonic sensor assembly of the first aspect also apply correspondingly to the motor vehicle of the second aspect.

The motor vehicle can be, in particular, a passenger motor vehicle or a heavy goods vehicle.

The motor vehicle may have an assistance system, such as a driving assistance system or a parking assistance system, which can be configured in particular for semi-autonomous or fully autonomous driving of the vehicle. Semi-autonomous driving is understood to mean for example that the parking assistance system controls a steering apparatus and/or an automatic gear selection system. Fully autonomous driving is understood to mean, for example, that the assistance system additionally also controls a drive device and a braking device. The assistance system may be implemented in the form of hardware and/or in the form of software. In the case of an implementation in the form of hardware, the assistance system may be, for example, in the form of a computer or a microprocessor. In the case of an implementation in the form of software, the assistance system may be in the form of a computer program product, a function, a routine, part of a program code, or an executable object. In particular, the assistance system may be part of a superordinate control system of the vehicle, for example an ECU (Engine Control Unit).

The assistance system can use the proposed ultrasonic sensor assembly for monitoring or measuring an environment of the motor vehicle and/or an interior of the motor vehicle by means of ultrasonic measurements based on the pulse-echo method.

According to one embodiment, the shaped part forms a section of an outer skin of the motor vehicle and the ultrasonic sensor is mounted on the shaped part on a side of the shaped part facing an interior of the vehicle, in such a way that the ultrasonic membrane covered by the screen section of the shaped part faces outwards with respect to the motor vehicle.

The ultrasonic sensor assembly can thus be concealed behind the outer skin of the motor vehicle. The acoustic metamaterial may be formed by a structuring processing, for example by perforation, of the outer skin in the region of the ultrasonic membrane of the ultrasonic sensor. Ultrasound measurements carried out then benefit from the increased echo signal amplitude. In embodiments in which the ultrasonic membrane is not coupled with the outer skin of the motor vehicle, the ultrasonic measurements carried out also benefit from the fact that no structure-borne noise is excited in the outer skin.

Since the openings are very small—preferably smaller than a wavelength of the ultrasonic waves—the design of the outer shell is barely affected.

It is also conceivable to provide a cleaning device which cleans the openings in the acoustic micromaterial when necessary or at regular intervals, by wiping, rinsing or blowing and keeps them free of dirt and rainwater. The cleaning device can be designed in the same way as a comparable cleaning device in the field of windscreen wiper technology.

According to a further embodiment, the shaped part is a shaped part provided in the vehicle interior and the ultrasonic sensor is mounted on the shaped part on a side of the shaped part facing outwards with respect to the motor vehicle, in such a way that the ultrasonic membrane covered by the screen section of the shaped part faces into the vehicle interior.

In the monitoring of the vehicle interior there is advantageously no problem due to penetration of dirt and rainwater, so that the proposed solution is particularly suitable here.

It is also conceivable that the shaped part forms a section of a wing mirror of the motor vehicle and the ultrasonic sensor is mounted on the shaped part on an internal side of the shaped part, in such a way that the ultrasonic membrane covered by the screen section of the shaped part faces downwards with respect to the motor vehicle.

This allows a surface underneath the vehicle, such as the depth of a puddle, for example, to be measured. In addition, due to the fact that the measurement direction points downwards and thus also the openings in the acoustic metamaterial face downwards, there is a reduced risk of dirt and rainwater entering the openings of the acoustic metamaterial.

Further possible implementations of the invention also comprise not explicitly mentioned combinations of features or embodiments described above or below with regard to the exemplary embodiments. A person skilled in the art will in this case also add individual aspects as improvements or additions to the respective basic form of the invention.

Further advantageous configurations and aspects of the invention are the subject of the dependent claims and of the exemplary embodiments of the invention that are described below.

The invention is furthermore explained in more detail below on the basis of preferred exemplary embodiments with reference to the accompanying figures.

Identical or functionally identical elements have been provided with the same reference signs in the figures, unless stated otherwise.

Figure 1:
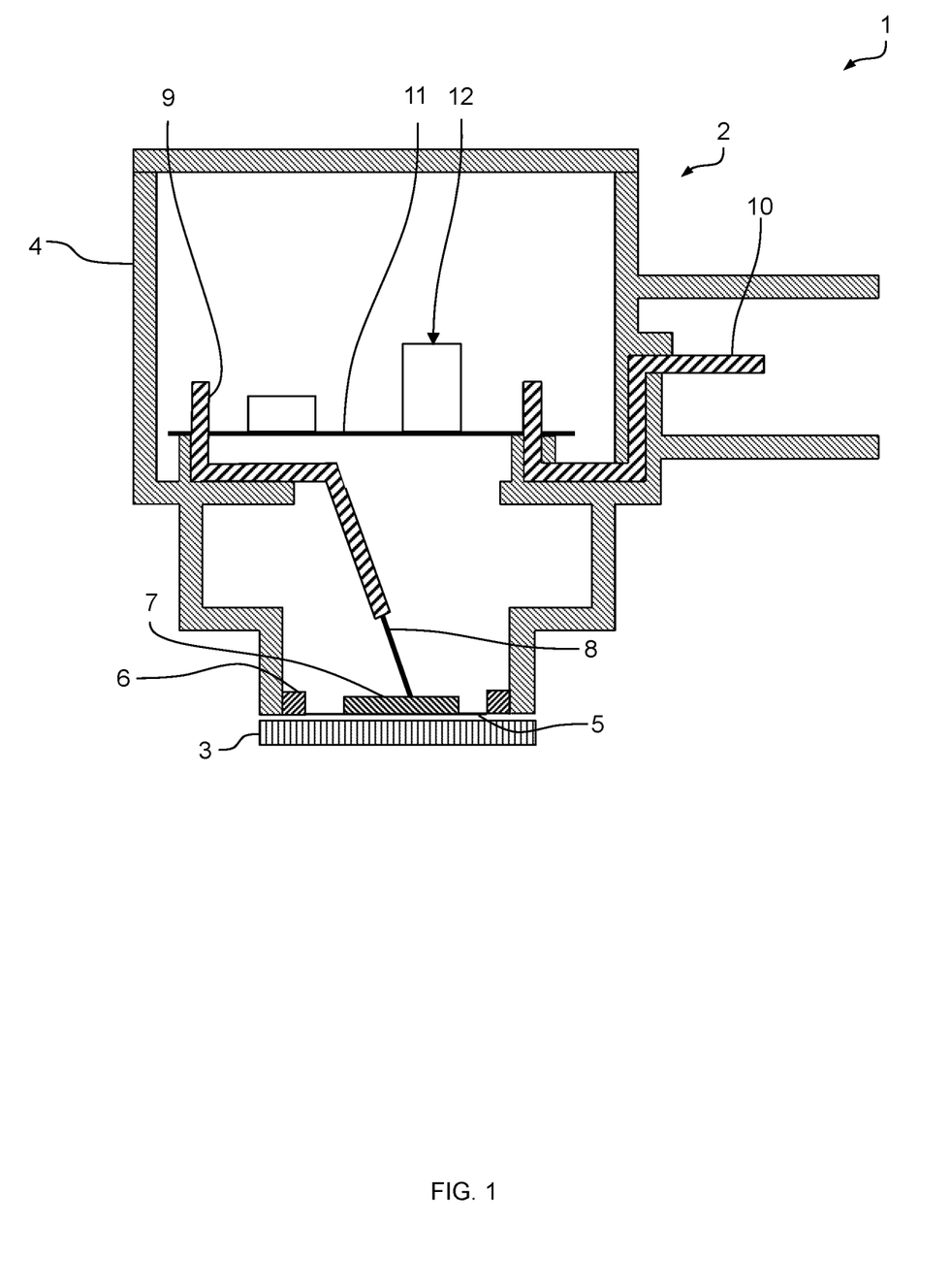
FIG. 1 shows a schematic view in section of an ultrasonic sensor assembly according to a first exemplary embodiment.

FIG. 1 shows a schematic view in section of an ultrasonic sensor assembly 1 according to a first exemplary embodiment. The ultrasonic sensor assembly 1 comprises an ultrasonic sensor 2 and a screen section 3.

The ultrasonic sensor 1 has a housing 4, which is made of an acoustically hard plastic. An ultrasonic membrane 5 is fitted into a decoupling ring 6 made of an acoustically soft material, such as silicone. An acoustic transducer element 7, such as a piezo element, is glued to an inner surface of the ultrasonic membrane 5. The assembly consisting of piezo element 7, ultrasonic membrane 5 and decoupling ring 6, is fitted into an opening of the housing 4.

The piezo element 7 is connected to a first metallic contact pin 9 via a decoupling wire 8. The decoupling wire 8 may have an excess length and therefore not be under tension. A second metallic contact pin 10 is fed out of the housing 4 to the outside. A printed circuit board 11 is mounted onto the metallic contact pins 9, 10. Electronic components 12 for electrical control of the piezo element 7 are mounted on the printed circuit board 11.

A control unit (23 in FIG. 3) of the motor vehicle (16 in FIG. 3) can thus be connected to the electronic components 12 of the ultrasonic sensor 2 via a lead, not shown, and the contact pin 10, and by transmitting electrical signals to the ultrasonic sensor 2, cause the components 12 to actuate the piezo element 7 and excite the ultrasonic membrane 5 into vibration and thereby emit an ultrasonic signal. Similarly, the control unit of the motor vehicle can receive electrical signals from the ultrasonic sensor 2 which are indicative of a vibration of the ultrasonic membrane 5 detected by the piezo element 7, and in this way measure a received or reflected ultrasonic signal.

It should be noted that the assembly of ultrasonic membrane 5 and piezo element 7 is fitted into the opening of the housing 4 by means of the decoupling ring 6 and is electrically contacted by means of the decoupling wire 8. In this way, the ultrasonic membrane 5 is completely mechanically decoupled from the housing 4.

The screen section 3 is arranged in front of the ultrasonic membrane 5 of the ultrasonic sensor 2 and is made of an, in particular broadband, acoustic metamaterial, which is described in detail later.

The screen section 3 is provided in particular separately from the ultrasonic sensor 2. The screen section 3 is provided in particular without a coupling element for coupling the ultrasonic sensor 2 to the screen section 3. A thin air gap can be formed between the ultrasonic membrane 5 and the screen section 3 in order to bring about a mechanical decoupling of the ultrasonic membrane 5 from the screen section 3 and other parts not shown (shaped parts, brackets and the like) connected to the screen section 3. However, it is also conceivable that the ultrasonic membrane 5 is in contact with the screen section 3 without contact pressure.

Advantageously, the acoustic metamaterial of the screen section 3 arranged in this way can significantly improve the signal-to-noise ratio of the measuring signal supplied by the ultrasonic sensor 2.

Figure 2:
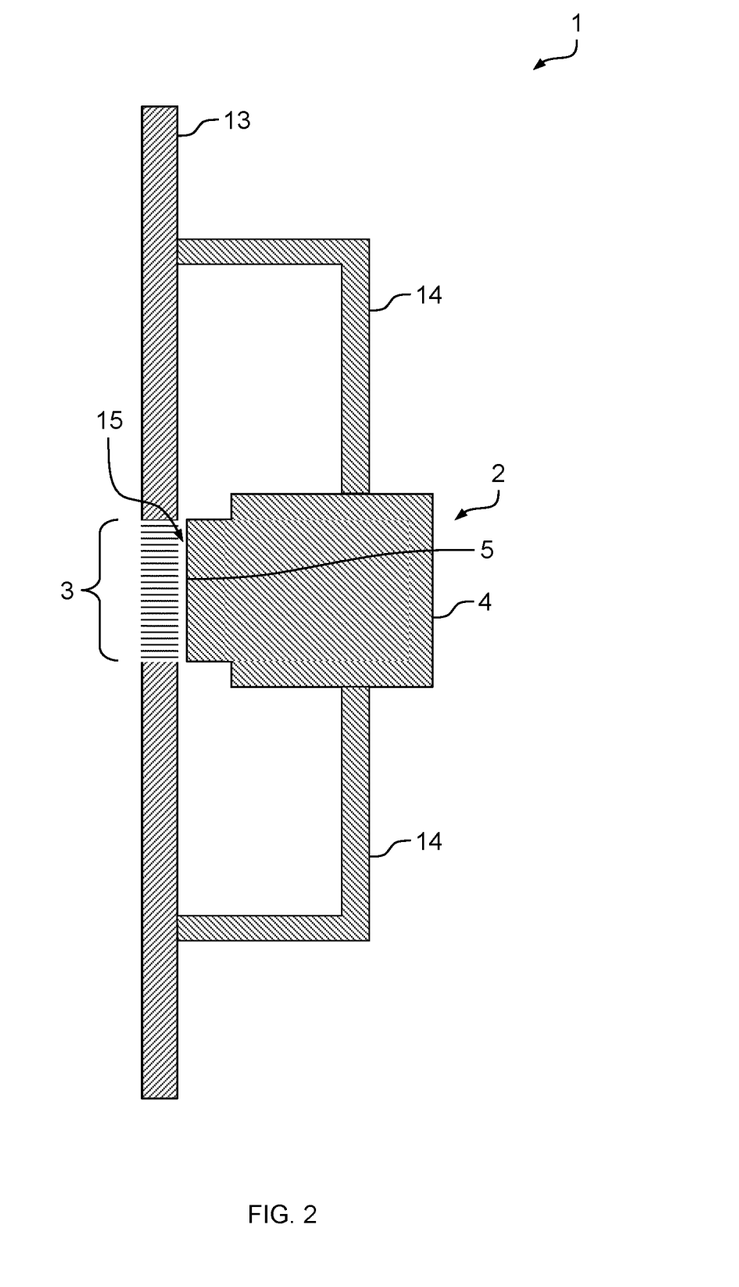
FIG. 2 shows a schematic view in section of an ultrasonic sensor assembly according to a second exemplary embodiment.

FIG. 2 shows a schematic view in section of an ultrasonic sensor assembly 1 according to a second exemplary embodiment.

The ultrasonic sensor 2 and the screen section 3 of the ultrasonic sensor assembly 1 of the second exemplary embodiment can be, for example, the ultrasonic sensor 2 and the screen section 3 of the first exemplary embodiment and are not described again.

In the second exemplary embodiment, the screen section 3 is a section which is formed integrally with a shaped part 13 and from the same acoustically hard base material as the shaped part 13. That is to say, the screen section 3 of the second exemplary embodiment is a section of the shaped part 13.

The shaped part 13 can, for example, be a section of an outer skin of a motor vehicle, such as a door outer panel, a fender, a wing panel or the like. However, the shaped part 13 may also be made of plastic and be, for example, a fender, a privacy screen, a vehicle interior paneling or the like. Since the shaped part 13 is formed from an acoustically hard base material, structure-borne sound or structural vibrations can occur in the shaped part 13.

In the screen section 3 of the shaped part 13, the base material of the shaped part 13 is formed into an acoustic metamaterial by a structuring processing.

Brackets 14 are mounted on an outer side of the housing 4. The brackets 14 in turn are fastened to the shaped part 13. In particular, the brackets 14 are fastened to the shaped part 13 in a region outside the screen section 3. The ultrasonic sensor 2 is retained by the brackets 14 in such a way that the ultrasonic membrane 5 of the ultrasonic sensor 2 is arranged parallel to the shaped part 13 behind the screen section 3 of the shaped part 13. An air gap 15, preferably approximately 0.1 mm thick, is accordingly formed between the acoustic metamaterial of the screen section 3 and the ultrasonic membrane 5 of the ultrasonic sensor 2.

Thus, although the shaped part 13, the brackets 14 and the housing 4 of the ultrasonic sensor 2, which are each made of acoustically hard materials, are mechanically coupled to each other, the ultrasonic membrane 5, as explained based on the first exemplary embodiment, is mechanically decoupled from the housing 4 of the ultrasonic sensor 2. Furthermore, the ultrasonic membrane 2 is also mechanically decoupled from the shaped part 13 by means of the air gap 15. Since the screen section 3 made of the acoustic metamaterial can also be tunneled by ultrasonic waves in a non-resonant manner, any influence of structural vibrations of the structure consisting of shaped part 13, brackets 14 and housing 4 on the quality of the measurement signal supplied by the ultrasonic sensor assembly 1 is severely reduced.

According to a derivative of the second exemplary embodiment, the ultrasonic membrane 5 is in contact with the screen section 3 or with the acoustic metamaterial 3. This means that according to the derivative, no air gap 15 is provided. The acoustic impedance of the acoustic metamaterial of the screen section 3 may be matched to the acoustic impedance of the ultrasonic membrane 5 on the side facing the ultrasonic sensor 2.

According to this derivative, either no or a weaker acoustic decoupling between the ultrasonic membrane 5 and the shaped part 13 can be achieved. However, the effect of amplifying the amplitudes of the measured echo signals brought about by the acoustic metamaterial 3 may turn out to be even stronger without the air gap 15 due to better impedance matching.

This allows the signal-to-noise ratio to be improved even further.

For a better acoustic decoupling of the shaped part 13, according to the derivative, damping elements, such as damping materials, damping bored holes or the like, can be provided on the shaped part 13 in a region outside the screen section 3. Alternatively, it is also conceivable to remove coupled-in structural vibrations from the measurement signal of the ultrasonic sensor 2 by computation.

Figure 3:
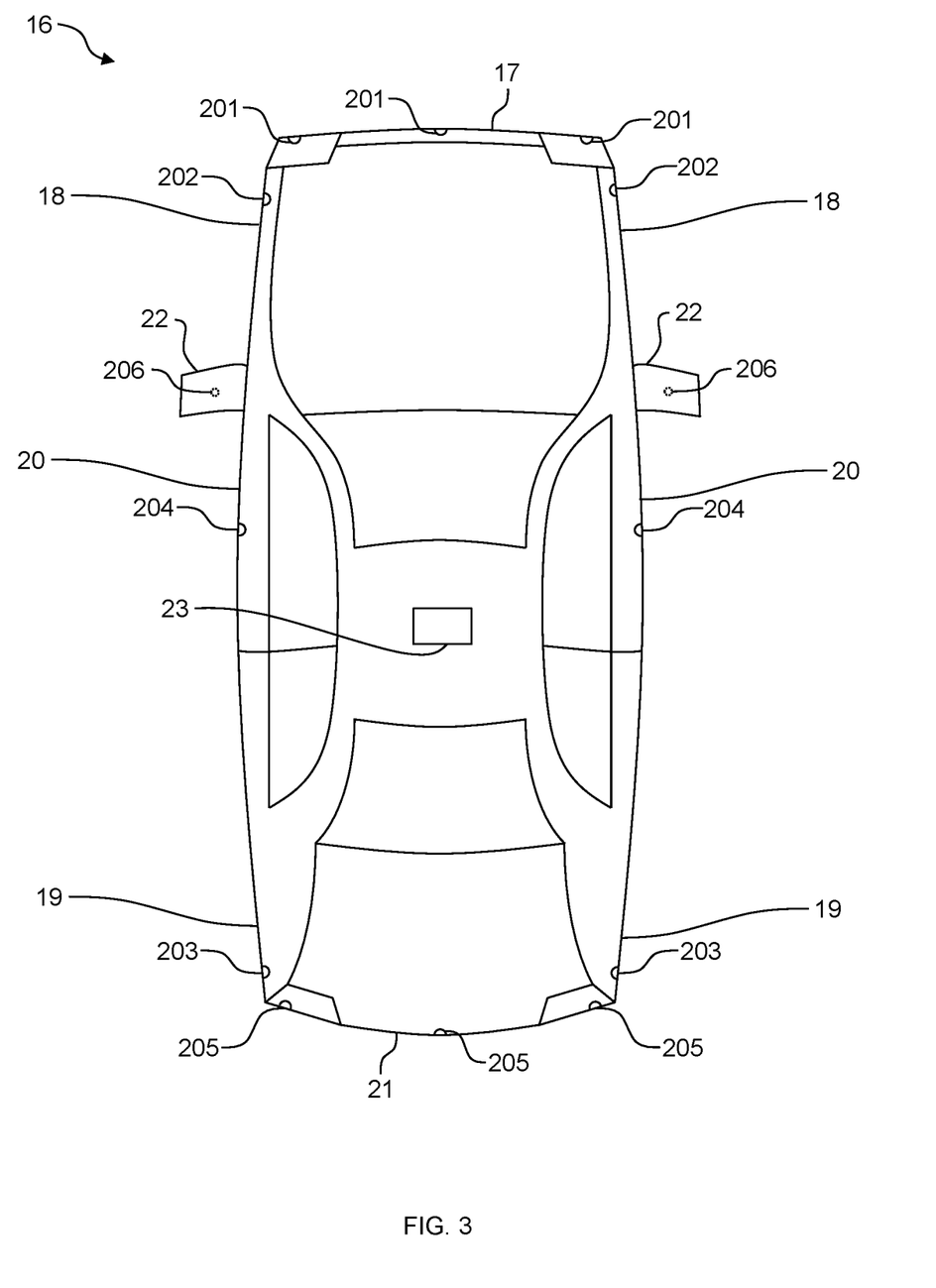
FIG. 3 shows a schematic plan view of a motor vehicle according to a third exemplary embodiment.

FIG. 3 shows a schematic top view of a motor vehicle 16 according to a third exemplary embodiment.

The motor vehicle 16 comprises a plurality of ultrasonic sensors 201-206. Three first ultrasonic sensors 201 are arranged in a covered position on a side of a front fender 17 (example of a shaped part 13, FIG. 2) facing the vehicle interior. Two second ultrasonic sensors 202 are arranged in a covered position on a side of a respective front wing 18 (example of a vehicle body shaped part 13, FIG. 2, which forms a section of an outer skin of the vehicle 16) facing the vehicle interior. Two third ultrasonic sensors 203 are arranged in a covered position on a side of a respective rear wing 19 (example of a vehicle body shaped part 13, FIG. 2, which forms a section of an outer skin of the vehicle 16) facing the vehicle interior. Two fourth ultrasonic sensors 204 are arranged in a covered position on a side of a respective outer door panel 20 (example of a vehicle body shaped part 13, FIG. 2, which forms a section of an outer skin of the vehicle 16) facing the vehicle interior. Three fifth ultrasonic sensors 205 are arranged in a covered position on a side of a front fender 21 (example of a shaped part 13, FIG. 2) facing the vehicle interior. Furthermore, two sixth ultrasonic sensors 206 are arranged in a covered position on an inner side of a lower shell of a respective vehicle wing mirror 22 (example of a shaped part 13, FIG. 2).

The ultrasonic membranes (5 in FIGS. 1, 2) of the ultrasonic sensors 201-206 are each covered by a screen section 3 (FIGS. 1, 2) of the respective shaped part 17-22, in which the base material of the respective shaped part 17-22 is formed into an acoustic metamaterial, and face outwards with respect to the motor vehicle 16 (ultrasonic sensors 201-205) or downwards (ultrasonic sensors 206).

Accordingly, an ultrasonic sensor assembly (1 in FIGS. 1, 2) according to the first and second exemplary embodiment is formed at each of the installation sites of the ultrasonic sensors 201 to 206 on the motor vehicle 16 of the third exemplary embodiment.

The motor vehicle 16 comprises a central control unit (shown schematically as 23), which forms a parking assistance system that uses the ultrasonic sensor assemblies formed by the ultrasonic sensors 201 to 206 for measuring an environment of the motor vehicle 16 based on the pulse-echo method.

Furthermore, ultrasonic sensors (not shown) may also be provided in the motor vehicle 16, the ultrasonic membranes (5 in FIG. 1, 2) of which face into the vehicle interior. Such ultrasonic sensors may be arranged, for example, on a side of a vehicle interior paneling facing outwards with respect to the motor vehicle (example of a shaped part 13, FIG. 2) and may be covered by a screen section (3, FIGS. 1, 2) consisting of an acoustic metamaterial formed in the vehicle interior paneling. The control unit 23 can use the inwardly facing ultrasonic sensors for monitoring the vehicle interior according to the pulse-echo method, for example for detecting the number of passengers, the luggage compartment load, for monitoring the health condition or the driving fitness of a driver of the motor vehicle 16, and the like.

Advantageously, all ultrasonic sensors 201-206 provided in the motor vehicle 16 are covered by a respective screen section (3 in FIGS. 1, 2) made of acoustic metamaterial, thereby benefiting on the one hand from protection against mechanical damage and viewing, and on the other hand from an improvement in the echo signal amplitude due to the acoustic metamaterial.

The acoustic metamaterial and its advantages are explained in more detail below based on measurements carried out with prototypes.

Figure 4:
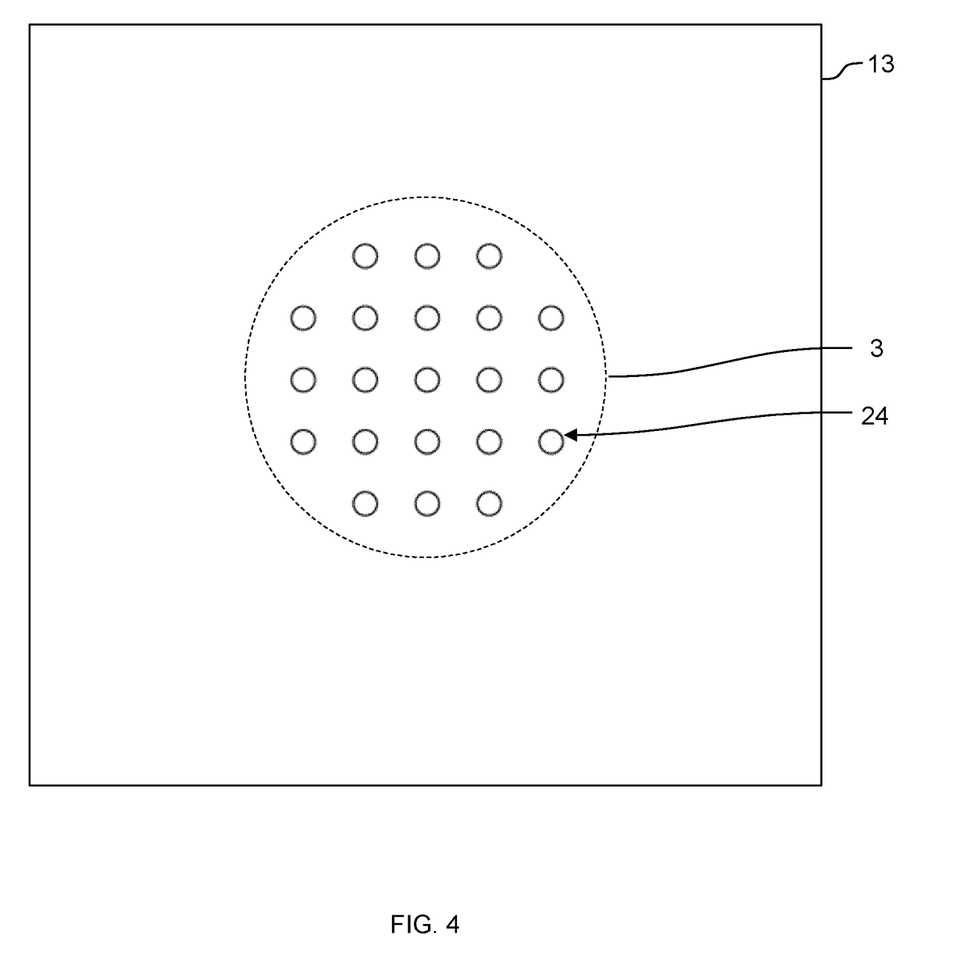
FIG. 4 shows a schematic plan view of a shaped part with a screen section made from an acoustic metamaterial according to exemplary embodiments.

FIG. 4 shows a schematic top view of a shaped part 13 with a screen section 3.

The shaped part 13 is made of an acoustically hard base material. Various prototypes for the shaped part 13 were produced from the base materials aluminum with 1 mm thickness, plastic with 3 mm thickness, and steel with 0.9 mm thickness. The prototypes each had an area of 10×10 cm$^2$.

In the screen section 3 of the shaped part 13, an acoustic metamaterial was formed by perforating the base material of the shaped part 13 in the screen section 3 in a specific manner. In particular, a regular lattice was formed of twenty-one round through-openings 24. The round through-openings 24 each had a diameter of 1 mm. The lattice had a hole spacing (distance between any two adjacent openings 24) of 2.5 mm. Thus, the diameter of the through-openings 24 and the hole spacing were each significantly smaller than the wavelength of the ultrasonic waves emitted by an ultrasonic sensor 2 (FIG. 1, 2), which is typically approximately 7 mm at room temperature. However, the hole spacing was greater than the opening diameter.

The perforated screen section 3 of the prototypes 13 was arranged in front of an ultrasonic membrane (5 in FIG. 1) of an ultrasonic sensor (2 in FIG. 1) and thereby formed an ultrasonic sensor assembly (1 in FIG. 1) with a covered ultrasonic sensor (2 in FIG. 1). In this case, the ultrasonic membrane (5 in FIG. 1) was arranged parallel to the screen section 3, wherein between the screen section 3 and the ultrasonic membrane (5 in FIG. 1) an air gap of 0.1 mm remained.

All of the above-mentioned prototypes of the shaped part 13 showed the advantageous effects described here. There is therefore a high level of design freedom with regard to material and thickness of the shaped part 13, behind which the ultrasonic sensor (2 in FIG. 1) can be arranged.

Below, by reference to FIGS. 5 to 7, where appropriate with cross reference to FIGS. 1, 2 and 4, measurement results for a covered ultrasonic sensor assembly 1, which is formed as described above from an ultrasonic sensor 2 and the prototype shaped part 13 of 0.9 mm thick steel with the perforated lattice comprising twenty-one through-openings 24, are compared to measurement results obtained with the same uncovered ultrasonic sensor 2 under the same test conditions.

Figure 5:
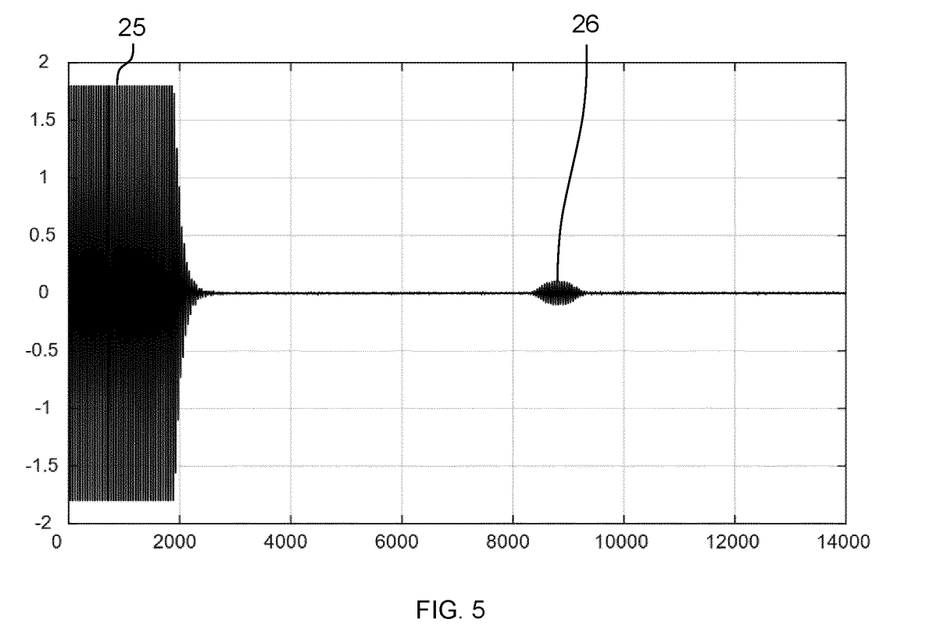
FIG. 5 shows a plot of a measured echo signal with an uncovered ultrasonic sensor.
Figure 6:
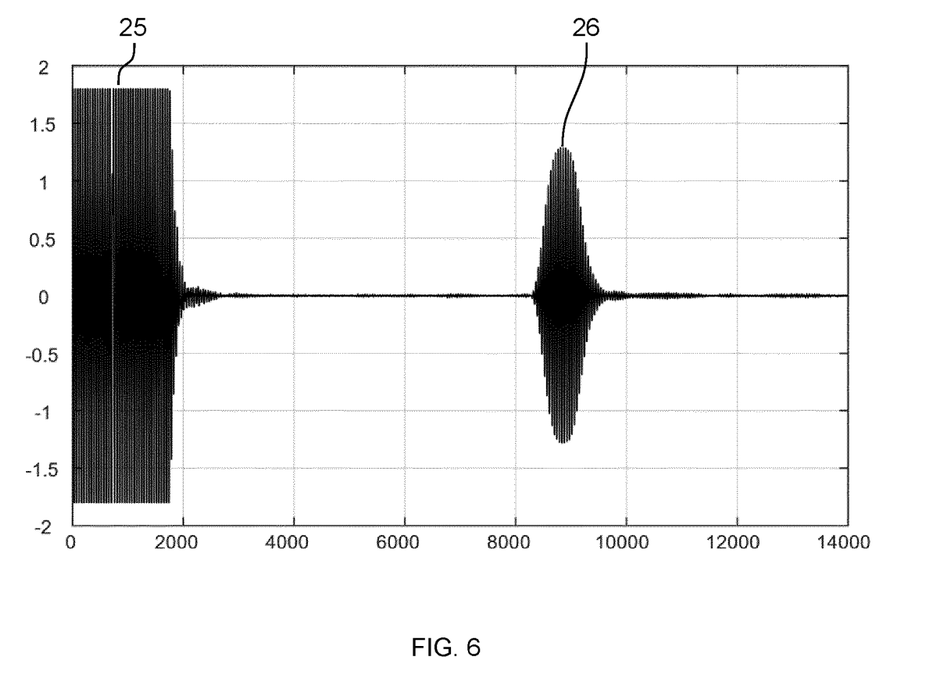
FIG. 6 shows a plot of a measured echo signal with the ultrasonic sensor from FIG. 5 when covered by the screen section of the shaped part from FIG. 4.

FIG. 5 shows a plot of a measured echo signal with an uncovered ultrasonic sensor, and FIG. 6 shows a plot of a measured echo signal with the covered ultrasonic sensor assembly 1. Along the horizontal axis in FIGS. 5 and 6, samples of the measurement signal supplied by the respective ultrasonic sensor 1 are plotted; the horizontal axis in FIGS. 5 and 6 can also be understood as a time axis. The voltage amplitude of the measurement signal in Volts is plotted on the vertical axis in FIGS. 5 and 6.

In a time range of 0 to 2000, structural vibrations 25 of the ultrasonic sensor 2 are measured, which occur inevitably during emission of an ultrasonic signal in spite of the mechanical decoupling of the ultrasonic membrane 5.

After a time of approximately 8700 samples, an echo signal 26 is observed. In the figures it can be clearly seen that the amplitude of the echo signal 26 in FIG. 6 of the ultrasonic sensor assembly 1 covered with the acoustic metamaterial is enhanced by a factor of approximately 10 compared to the amplitude of the echo signal 26 in FIG. 5 of the uncovered ultrasonic sensor 2, in otherwise identical test conditions. Accordingly, the signal-to-noise ratio has been improved by a factor of approximately 10.

Figure 7:
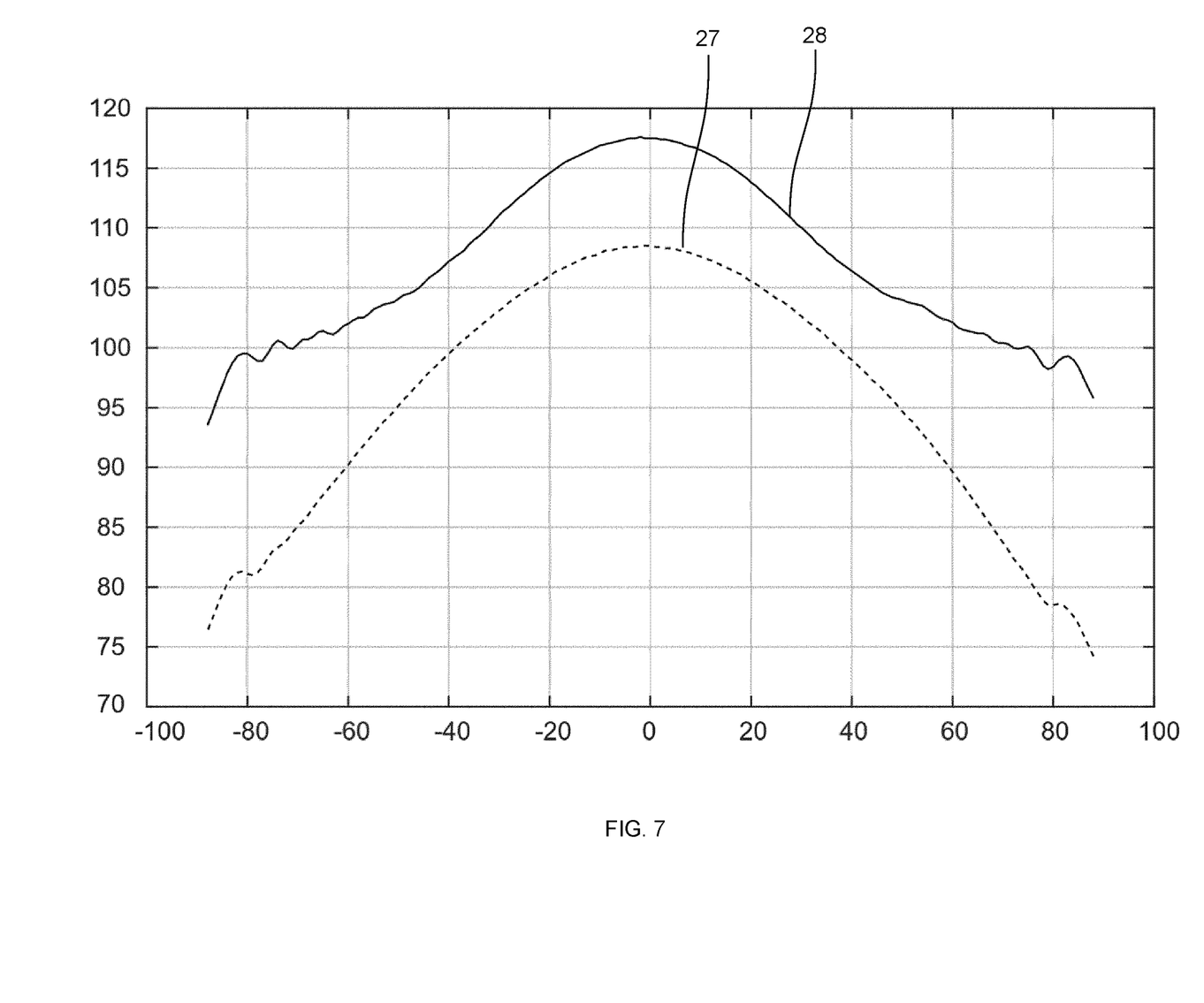
FIG. 7 shows a plot of an angle-dependent transmission beam characteristic of an ultrasonic sensor covered with a metamaterial and an uncovered ultrasonic sensor.

FIG. 7 shows a plot of an angle-dependent transmission beam characteristic of an uncovered ultrasonic sensor 2 and the covered ultrasonic sensor assembly 1 in the same measurement arrangement that was also used for the measurements shown in FIG. 5 and FIG. 6.

Along the horizontal axis in FIG. 7, an angle relative to the surface normal of the shaped part 13 is plotted in degrees, and along the vertical axis in FIG. 7 a sound pressure level of the transmit signal is plotted in dB.

The dashed curve 27 shows the transmission beam characteristic of the uncovered ultrasonic sensor 2, and the solid curve 28 shows the transmission beam characteristic of the covered ultrasonic sensor assembly 1.

As can be seen in FIG. 7, the covered ultrasonic sensor assembly 1 with the broadband acoustic metamaterial proves to be advantageous in the entire relevant angle range from approximately −85° to 85°. The sound pressure level is consistently significantly higher than with the uncovered ultrasonic sensor 2.

This shows that the structure of a screen section 3 described on the basis of FIG. 4 for forming an acoustic metamaterial of both outgoing and incident ultrasonic waves can be tunneled through in a non-resonant manner in a wide angle range.

Although the present invention has been described on the basis of exemplary embodiments, it may be modified in many ways. In particular, the described application examples in the motor vehicle 16 are to be understood purely as examples. The proposed ultrasonic sensor assembly also has numerous other fields of application. For example, a traveling robot in a fac-tory installation could also advantageously measure its surroundings with a corresponding ultrasonic sensor assembly.

LIST OF REFERENCE SIGNS 1 ultrasonic sensor assembly
2 ultrasonic sensor
3 screen section
4 housing
5 ultrasonic membrane
6 decoupling ring
7 transducer element, piezo element
8 decoupling wire
9 contact pin
10 contact pin
11 printed circuit board
12 electronic components
13 shaped part
14 mounting brackets
air gap
16 motor vehicle
17 front fender
18 front wings
19 rear wings
20 door outer panel
21 rear fender
22 wing mirrors
23 control unit
24 through-openings
25 structural vibrations 26 echo signal
27 transmission beam characteristic of an uncovered ultrasonic sensor
28 transmission beam characteristic of the covered ultrasonic sensor assembly

The invention claimed is:

1. An ultrasonic sensor assembly for a motor vehicle, comprising: an ultrasonic sensor having a housing; an ultrasonic membrane mechanically decoupled from the housing; a sound transducer element for exciting first ultrasonic waves vibrations and detecting second ultrasonic waves through vibrations of the ultrasonic membrane, wherein the first ultrasonic waves and the second ultrasonic waves have a frequency at or above 40 kilohertz; and a screen section arranged in front of the ultrasonic membrane and made of an acoustic metamaterial; wherein the acoustic metamaterial is formed from an acoustic base material in which a lattice of a plurality of through-openings is formed.

2. The ultrasonic sensor assembly as claimed in claim 1, wherein the acoustic metamaterial is a broadband acoustic metamaterial which is tunneled by the first ultrasonic waves and the second ultrasonic waves in a non-resonant manner, at least in an incidence angle range.

3. The ultrasonic sensor assembly as claimed in claim 1, wherein a diameter of each of the plurality of through-openings is smaller than a wavelength of the first ultrasonic waves and the second ultrasonic waves.

4. The ultrasonic sensor assembly as claimed in claim 3, wherein a distance between two adjacent through-openings among the plurality of through-openings of the lattice is greater than the diameter of the plurality of through-openings and less than the wavelength of the first ultrasonic waves and the second ultrasonic waves.

5. The ultrasonic sensor assembly as claimed in claim 1, wherein the plurality of through-openings is filled with a filler material that differs from the acoustic base material.

6. The ultrasonic sensor assembly as claimed claim 1, further comprising:
a shaped part, on which the ultrasonic sensor is mounted in such a way that the ultrasonic membrane faces the shaped part,
wherein the shaped part comprises the screen section of the acoustic metamaterial, in a section in front of the ultrasonic membrane.

7. The ultrasonic sensor assembly as claimed in claim 6, wherein the ultrasonic sensor is mounted on the shaped part by an outer wall of the housing of the ultrasonic sensor being connected to a bracket and the bracket being fastened to the shaped part in a region outside the screen section, wherein a surface of the ultrasonic membrane is arranged parallel to the shaped part behind the screen section of the shaped part.

8. The ultrasonic sensor assembly as claimed in claim 7, wherein the shaped part is a vehicle body shaped part.

9. The ultrasonic sensor assembly as claimed in claim 7, wherein the shaped part consists of a vehicle body panel, a fender, a lower shell of a vehicle wing mirror, a privacy screen, or a vehicle interior paneling.

10. The ultrasonic sensor assembly as claimed in claim 1, wherein the ultrasonic membrane is in contact with the screen section.

11. The ultrasonic sensor assembly as claimed in claim 1, wherein the ultrasonic membrane and the screen section are mechanically decoupled.

12. The ultrasonic sensor assembly as claimed in claim 11, wherein an air gap is formed between the ultrasonic membrane and the screen section.

13. A motor vehicle having at least one ultrasonic sensor assembly as claimed in claim 1.

14. The motor vehicle as claimed in claim 13, wherein a shaped part forms a portion of an outer skin of the motor vehicle and the ultrasonic sensor is mounted on the shaped part on a side of the shaped part facing an interior of the motor vehicle, in such a way that the ultrasonic membrane covered by the screen section of the shaped part faces outward with respect to the motor vehicle.

15. The motor vehicle as claimed in claim 13, wherein a shaped part provided in a vehicle interior and the ultrasonic sensor is mounted on the shaped part on a side of the shaped part facing outwards with respect to the motor vehicle, in such a way that the ultrasonic membrane covered by the screen section of the shaped part faces into the vehicle interior.

16. The ultrasonic sensor assembly as claimed in claim 1, wherein the acoustic metamaterial is configured to increase an amplitude of the second ultrasonic waves.

* * * * *